United States Patent
Howie (12)

(10) Patent No.: US 10,323,718 B2
(45) Date of Patent: Jun. 18, 2019

(54) MECHANICAL CABLE END FITTING AND SYSTEM

(71) Applicant: LIPPERT COMPONENTS, INC., Elkhart, IN (US)

(72) Inventor: Mark Howie, Edwardsburg, MI (US)

(73) Assignee: Lippert Components, Inc., Elkhart, IN (US)

( * ) Notice: Subject to any disclaimer, the term of this patent is extended or adjusted under 35 U.S.C. 154(b) by 0 days.

(21) Appl. No.: 15/723,388

(22) Filed: Oct. 3, 2017

(65) Prior Publication Data

US 2018/0094695 A1 Apr. 5, 2018

Related U.S. Application Data

(60) Provisional application No. 62/403,943, filed on Oct. 4, 2016.

(51) Int. Cl.

| | |
|---|---|
| *F16M 11/00* | (2006.01) |
| *F16G 11/02* | (2006.01) |
| *F16M 13/02* | (2006.01) |
| *F16G 11/10* | (2006.01) |
| *F16G 11/12* | (2006.01) |

(52) U.S. Cl.
CPC .............. *F16G 11/02* (2013.01); *F16G 11/10* (2013.01); *F16G 11/12* (2013.01); *F16M 13/02* (2013.01)

(58) Field of Classification Search
CPC ............................ F16C 11/103; F16M 13/02
See application file for complete search history.

(56) References Cited

U.S. PATENT DOCUMENTS

| | | | | |
|---|---|---|---|---|
| 4,738,155 A | * | 4/1988 | Stocker ...................... | F16C 1/14 403/197 |
| 4,984,669 A | * | 1/1991 | Hoffman ................. | F16D 1/072 192/105 R |
| 5,496,968 A | * | 3/1996 | Katoh .................... | H01R 4/183 174/19 |
| 5,584,212 A | * | 12/1996 | Wild ........................ | F16C 1/14 403/319 |

* cited by examiner

*Primary Examiner* — Amy J. Sterling
(74) *Attorney, Agent, or Firm* — Nixon & Vanderhye P.C.

(57) ABSTRACT

A cable end fitting includes a disc-shaped head and a shank, with the shank configured for attachment to an end of a cable. The fitting may be used in combination with a bracket defining an opening shaped to permit engagement and disengagement of the fitting and the bracket when the fitting and the bracket are in a first relative orientation but not when the fitting and the bracket are in a second relative orientation.

17 Claims, 4 Drawing Sheets

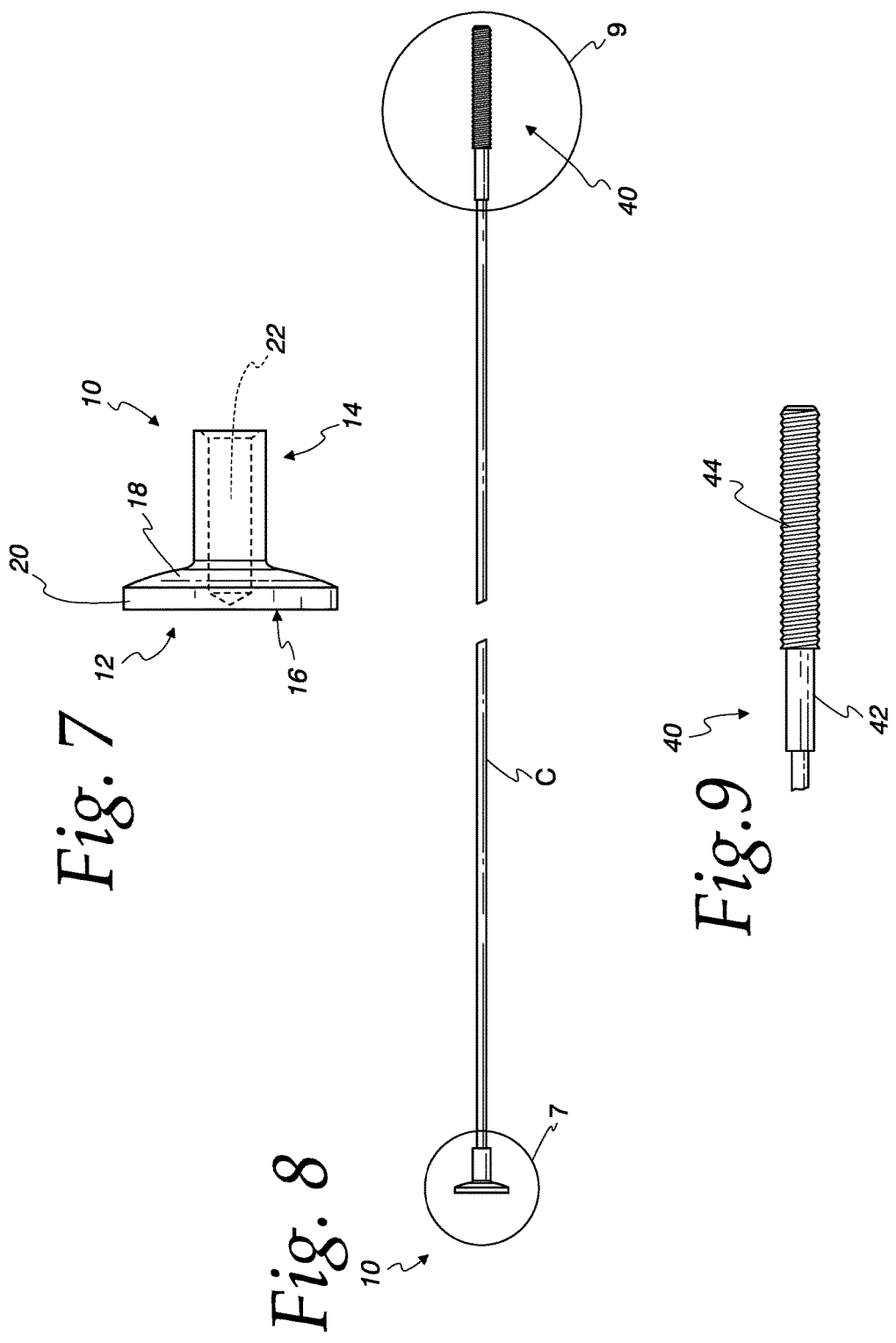

MECHANICAL CABLE END FITTING AND SYSTEM

CROSS-REFERENCE TO RELATED APPLICATION

This application claims benefit under 35 U.S.C. § 119 of U.S. Provisional Patent Application No. 62/403,943, filed Oct. 4, 2016, and incorporates the disclosure thereof in its entirety.

BACKGROUND AND SUMMARY OF THE DISCLOSURE

Mechanical cables (or wire ropes) may be used to transmit force between an actuator and a driven structure. For example, a cable may be used to transmit force between an actuator and a slide out room of a recreational vehicle (RV) (or an intervening bracket) to displace the slide out room between a first position in which the slide out room extends outwardly from the vehicle and a second position in which the slide out room is retracted into an interior space of the vehicle.

It is known to provide the ends of a mechanical cable with fittings configured to engage the cable end with the driven structure. Such a fitting may take the form of a ball-and-shank or hemisphere-and-shank configured to be crimped or swaged onto the cable end. The ball or hemisphere portion of such structures may engage with the driven structure via a slot defined by the driven structure, the slot generally being configured to allow the cable, but not the fitting to pass there through. A portion of the slot, however, may include an enlarged end or keyhole through which both the cable and fitting may pass to enable selective connection and disconnection of the cable and fitting with the driven structure.

A disadvantage of such fittings is that the ball configuration allows the ball or hemisphere to coin or otherwise deform portions of the driven structure defining the slot. Also, such fittings are known to become unintentionally disconnected from the driven structure when the cable is slackened due to play between the slackened cable and the driven structure.

BRIEF DESCRIPTION OF THE DRAWINGS

FIG. 7 is a side elevation view of an illustrative cable end fitting according to the present disclosure;

FIG. 8 is a side elevation view of the cable end fitting of FIG. 7, a cable attached at a first end to the fitting, and a second fitting attached to a second end of the cable; and FIG. 9 is a side elevation view of the second fitting of FIG. 8.

DETAILED DESCRIPTION OF THE DRAWINGS

The drawings show illustrative embodiments of a cable end fitting and a system including a cable end fitting and a corresponding bracket configured to receive and bear against the fitting.

Figure 1:
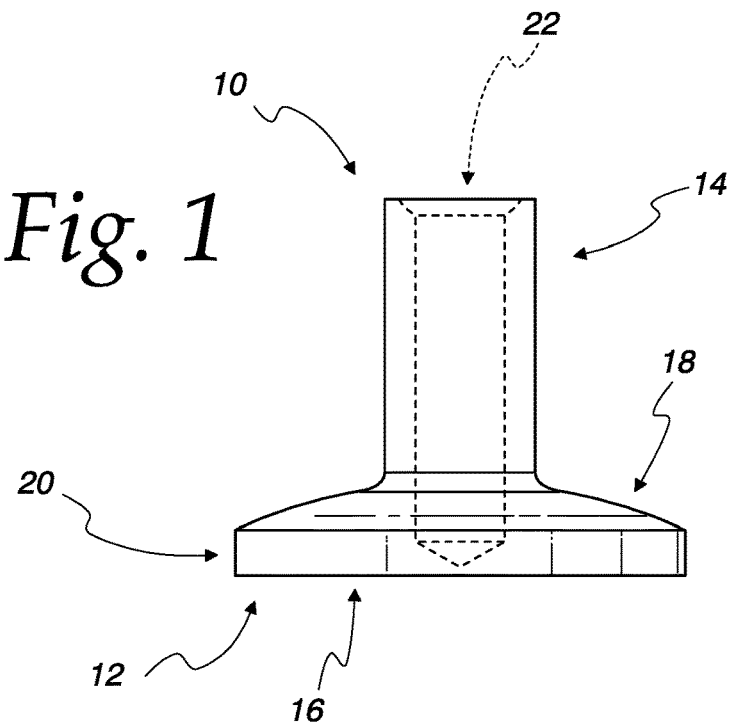
FIG. 1 is a side elevation view of an illustrative cable end fitting according to the present disclosure.

FIG. 1 shows an illustrative cable end fitting 10. The fitting 10 includes a bearing portion 12 (sometimes referred to herein as a head portion or head) and a cable-retaining portion 14 (sometimes referred to herein as a shank portion or shank). The head 12 and shank 14 are shown as monolithically formed, but could be fabricated separately and integrated by any suitable means.

Figure 6:
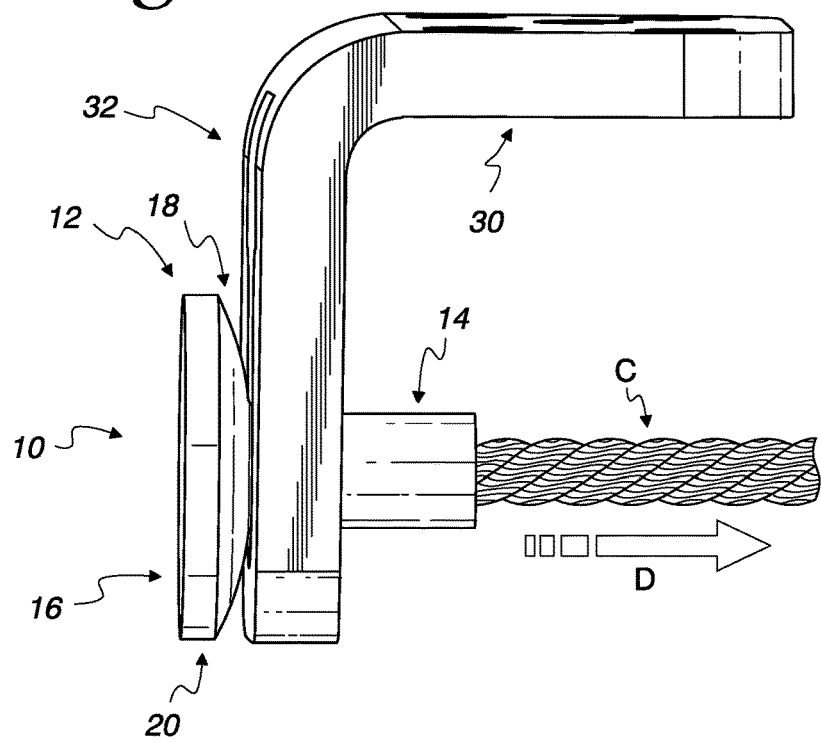
FIG. 6 is a side elevation view of the cable end fitting and corresponding bracket of FIG. 5.

The head 12 has a generally circular cross section, as better seen in FIGS. 3-5 and 7. A first surface 16 of the head 12 may be, but need not be, substantially planar. A second surface 18 of the head 12 may have a generally curved contour, for example, as best shown in FIGS. 1, 6, and 7. The curved contour may, but need not, define a portion of a sphere or other curved surface or surface of revolution. The curved contour may vary from region to region of the second surface. In another embodiment, the second surface 18 of the head 12 may have a frusto-conical surface. The first and second surfaces 16, 18 of the head 12 may cooperate to define an edge surface 20 there between. In other embodiments, the head could have another, non-circular cross section. For example, the head 12 could have a square cross-section.

The shank 14 is shown as generally annular, having a side wall defining a bore 22 configured to receive an end of a cable C as shown in FIG. 6. The side wall of the shank 14 may be crimped or swaged onto the cable C in order to integrate the fitting 10 and the cable. The shank 14 is shown as extending from the second surface 18 of the head 12, concentric with the head.

The fitting 10 and attached cable C may be included in a system further including a bracket 30, as shown in FIGS. 3-6. The bracket 30 is shown as including a first planar flange 30A and a second planar flange 30B attached to and extending from an end of the first flange. 30A. The first flange 30A and second flange 30B are shown as being generally perpendicular to each other, but could be configured in other ways. Although the flanges 30A and 30B are shown as planar, they could have other contours. In an embodiment, the bracket 30 could comprise a single planar or contoured flange. In other embodiments, the bracket 30 could take other forms.

Figure 3:
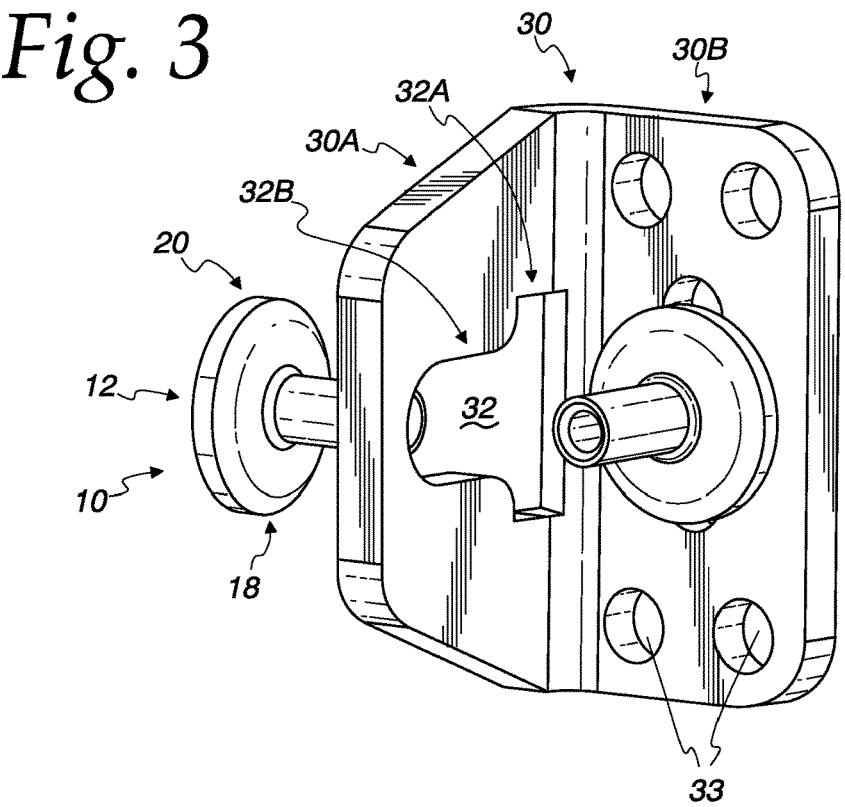
FIG. 3 is a perspective view of two illustrative cable end fittings and a corresponding bracket according to the present disclosure.
Figure 4:
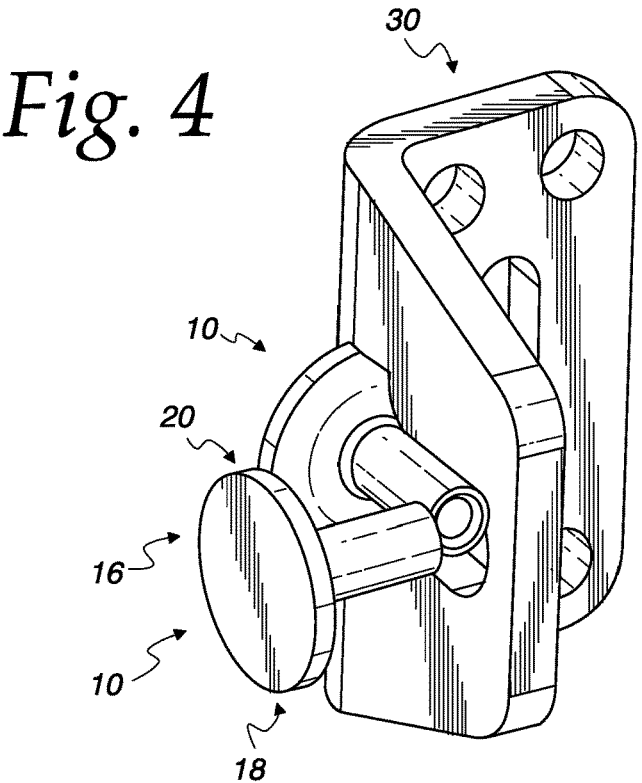
FIG. 4 is another perspective view of two illustrative cable end fittings and a corresponding bracket according to the present disclosure.
Figure 5:
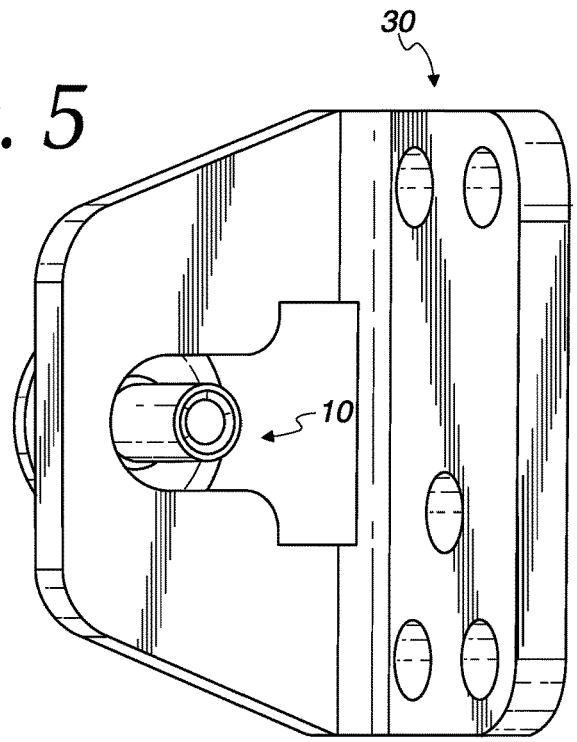
FIG. 5 is a perspective view of an illustrative cable end fitting and a corresponding bracket according to the present disclosure.

The first flange 30A of the bracket 30 defines a generally T-shaped or bell-shaped opening 32 defining a first portion 32A and a second portion 32B. The edges of the first flange 30A defining the opening 32 may be square, as shown in the drawings. Alternatively, the foregoing edges may be chamfered or rounded. As best shown in FIGS. 3, 4, and 6, the opening 32 is configured to permit the head 12 of the fitting 10 to pass through the first portion 32A of the opening, but not through the second portion 32B of the opening. Further, the opening 32 is configured to permit the head 12 of the fitting 10 (and the adjacent portion of an attached cable C, if present) to pass through the first portion 32A when the fitting is oriented with the shank 14 generally parallel to portion of the bracket 30 defining the opening (or with the diametric dimension of the head 12 generally perpendicular to the portion of the bracket defining the opening), and to not permit the fitting to pass there through when the fitting is oriented with the shank generally perpendicular to the portion of the bracket defining the opening (or with the diametric dimension of the head generally parallel to the portion of the bracket defining the opening). This functionality may be achieved by appropriately selecting the dimensions of the opening 32 and the dimensions of the head 12 and the shank 14 of the fitting 10.

The second flange 32B of the bracket 30 may define one or more apertures configured to receive fasteners (not shown) that may be used to attach the bracket to another structure, for example, a wall, floor, or ceiling of a slide out room of an RV.

Figure 2:
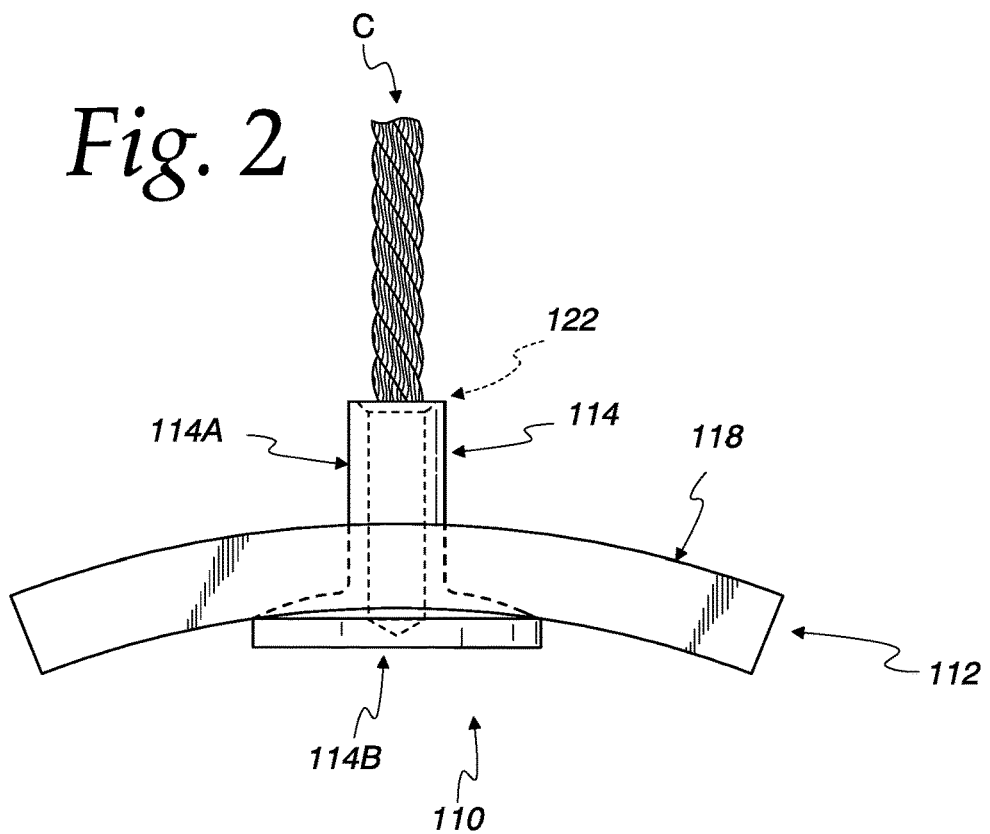
FIG. 2 is a side elevation view of another illustrative cable end fitting according to the present disclosure.

FIG. 2 illustrates another embodiment of a cable end fitting 110. The fitting 110 includes a head portion 112 and a shank portion 114. The head 112 is embodied as a disc defining an aperture (not shown) there through, for example, through the center thereof. The shank 114 includes a shaft portion 114A and a retainer portion 114B attached to an end of the shaft portion. The shank 114 may be monolithically formed. The aperture (not shown) in the head 112 is configured to allow the shaft portion 114A of the shank 114 to pass there through, but to not allow the retainer portion 114B of the shank to pass there through. The shaft portion 114A of the shank 114 may be annular or otherwise define an opening 122 configured to receive an end of a cable C. The shank 114 may be crimped or swaged onto the cable C thereby integrating the shank and the cable. The fitting 110 may interact with a corresponding bracket (not shown) in manners similar to the foregoing interactions of the fitting 10 and the bracket 30.

The other end of the cable C may be attached to a prime mover, for example, a telescopic actuator or an electric motor, either directly or through a linkage, configured to selectively tension the cable, thereby selectively imparting a load onto the bracket 30 via the head 12, 112 of the fitting 10, 110. The contour of the second surface 18, 118 of the head 12, 112 of the fitting 10, 110 may be selected to promote the ability of the head to articulate with respect to the mating surface of the bracket 30 in movable bearing relation relationship, even under load, without undue coining or deformation of either of the head and the bracket by the other of the head and the bracket.

FIG. 6 illustrates the fitting 10 oriented with respect to the bracket 30 with the shank 14 extending in a drive direction D of the cable C. With the fitting 10 so oriented, the relative configurations of the fitting and opening 32 preclude the fitting from becoming unintentionally disengaged from the bracket 30, even if the cable C were to become slack. In order to disengage the fitting 10 from the bracket 30, the fitting would need to be rotated substantially (for example, by about 90 degrees) from the orientation shown so that it could displaced through the opening 32. This would require considerably more slack in the cable C than would be encountered during normal operation of a system including the fitting 10, the bracket 30, and the cable C.

As discussed above, the second surface 18 of the head 12 of the fitting 10 may have a frusto-conical or curved contour. Other curved contours may be acceptable, as well. The contour of this surface may be selected to promote articulation of the fitting 10 with respect to the surface of the bracket 30 defining the opening 32, and particularly the second portion 32B of the opening. The contour of the second surface 18 of the head 12 may be selected to be continuous, that is lacking a sharp edge or corner or surface interruption that may impede free articulation of the head with respect to the edges of the bracket 30 defining the second portion 32B of the opening 32, particularly when the head is under load against the bracket. This feature may preclude kinking of the cable C at its interface with the shank 14 of the head when the cable is tensioned and the head 12 is loaded against the bracket 30.

FIG. 7 shows an embodiment of the fitting 10 of FIG. 1 with illustrative dimensions for the major diameter of the head 12 (as defined by the edge surface 20), the radius of curvature of the second surface 18, and the height of the edge surface 20, among others. These dimensions are illustrative and not limiting. The ratio of radius of curvature of the second surface 18 to the radius of the head 12 (that is, the major diameter of the head divided by two) of the FIG. 7 embodiment is about 1.5 (that is, 0.56 divided by 0.375, wherein 0.375 is the major diameter of 0.75 divided by 2). In other embodiments, the ratio could by anywhere with the range of about 1.25 to about 2.0 or in any range bounded by 1.25 and 2.0. In an embodiment, the ratio of radius of curvature of the second surface 18 to the radius of the head 12 may be outside the foregoing ranges. The illustrative unit of length set forth in FIG. 7 is inches, although any other unit of length could be used.

FIG. 8 shows the fitting 10, the cable connected at a first end to the fitting, and a second fitting 40 attached to a second end of the cable. The second fitting includes a shank 42 and an end 44. The shank may be generally annular, thereby defining an opening (not shown) therein. The opening may be configured to receive the second end of the cable C therein. The shank 42 may be configured to be crimped or swaged onto the second end of the cable C to integrate the second fitting 40 and the cable. The end 44 may be threaded and configured to mate with a corresponding nut to thereby attach the second end of the cable C to another structure (not shown), for example, another bracket.

Although the drawings show only the fitting 10 in combination with the bracket 30, the fitting 110 could be similarly combined with the bracket 30. Also, features disclosed in the context of a given embodiment may be incorporated into any other embodiment to the greatest extent possible.

Any discrepancy between the present disclosure and that of the priority document referred to above and incorporated by reference herein shall be resolved in favor of the present disclosure.

The embodiments shown and described herein are illustrative and not limiting.

The invention claimed is:

1. A system comprising:
    a cable end fitting comprising:
        a generally disc-shaped head having a peripheral edge surface, a first surface and a second surface opposite the first surface, the second surface having a contour; and
        an elongated shank extending from the second surface, at least a portion of the shank being annular and thereby defining a longitudinally-extending opening therein, the opening configured to receive an end of a cable and swagable onto the cable; and
    a bracket selectively engageable with the cable end fitting, the bracket defining a generally T-shaped opening, a first portion of the T-shaped opening configured to allow the entirety of the head of the fitting to selectively pass there through, and a second portion of the T-shaped opening configured to not allow the entirety of the head of the fitting to pass there through;
    wherein the contour of the second surface of the fitting is selected to preclude the second surface from coining portions of the bracket defining the T-shaped opening in response to interaction of the second surface of the fitting with the portions of the bracket defining the T-shaped opening.

2. The system of claim 1 wherein the contour of the second surface is continuous in regions of the second surface engageable with portions of the bracket defining the second portion of the T-shaped opening.

3. The system of claim 2 wherein the second surface has a curved contour.

4. The system of claim 2 wherein the second surface has a frusto-conical contour.

5. The system of claim 3 wherein the head has a major diameter and the curved contour in regions engageable with the bracket has a radius, and wherein the ratio of the major diameter divided by two to the radius is in the range bounded by 1.25 and 2.0.

6. The system of claim 3 wherein the head has a major diameter and the curved contour in regions engageable with the bracket has a radius, and wherein the ratio of the major diameter divided by two to the radius is in the range bounded by 1.4 and 1.6.

7. The system of claim 3 wherein the head has a major diameter and the curved contour in regions engageable with the bracket has a radius, and wherein the ratio of the major diameter divided by two to the radius is in the range bounded by 1.45 and 1.55.

8. The system of claim 1 wherein the contour of the second surface is continuous in all regions of the second surface engageable with portions of the bracket defining the second portion of the T-shaped opening.

9. The system of claim 8 wherein the second surface has a curved contour in all regions of the second surface engageable with portions of the bracket defining the second portion of the T-shaped opening.

10. The system of claim 8 wherein the second surface has a frusto-conical contour in all regions of the second surface engageable with portions of the bracket defining the second portion of the T-shaped opening.

11. The system of claim 1 in combination with the cable, wherein the end of the cable is received in the opening and the shank is swaged onto the end of the cable.

12. The system of claim 1 wherein the fitting and the bracket are configured to permit engagement and disengagement of the fitting and the bracket when the fitting and the bracket are in a first relative orientation but not when the fitting and the bracket are in a second relative orientation.

13. The system of claim 12 wherein the diametric dimension of the head is perpendicular to the portion of the bracket defining the opening in the first orientation, and wherein the diametric dimension of the head is parallel to the portion of the bracket defining the opening in the second orientation.

14. The system of claim 1 wherein the bracket comprises a first portion and a second portion, the first portion of the T-shaped opening being at or proximate an interface between the first portion and the second portion of the bracket.

15. The system of claim 14 wherein each of the first portion and the second portion of the bracket is generally planar and the first portion of the bracket is generally perpendicular to the second portion of the bracket.

16. The system of claim 15 wherein the second portion of the bracket is configured for mounting to another structure.

17. The system of claim 1 further comprising another structure, the bracket mounted to the another structure.

* * * * *